(12) United States Patent
Western

(10) Patent No.: US 6,389,236 B1
(45) Date of Patent: May 14, 2002

(54) ANAGLYPH AND METHOD

(76) Inventor: Owen C. Western, 6274 Lake Apopka Pl., San Diego, CA (US) 92119-3521

( * ) Notice: Subject to any disclaimer, the term of this patent is extended or adjusted under 35 U.S.C. 154(b) by 0 days.

(21) Appl. No.: 09/495,721

(22) Filed: Feb. 1, 2000

(51) Int. Cl.[7] .............................................. G03B 35/00
(52) U.S. Cl. ....................................... 396/324; 355/22
(58) Field of Search ........................... 355/22; 396/322, 396/324, 325, 329, 333

(56) References Cited

U.S. PATENT DOCUMENTS

| | | | |
|---|---|---|---|
| 1,592,034 A | * | 7/1926 | Macy ........................... 355/22 |
| 3,732,008 A | * | 5/1973 | Lasalle ........................ 355/22 |
| 4,734,756 A | * | 3/1988 | Butterfield et al. ........... 348/47 |
| 6,037,971 A | * | 3/2000 | McLaine et al. .............. 348/47 |

* cited by examiner

*Primary Examiner*—David M. Gray
(74) *Attorney, Agent, or Firm*—Calif Tervo

(57) ABSTRACT

The method of making the anaglyph on a page of an object comprises the steps of: producing left and right stereoscopic views of the object; and then, producing a left anaglyph image adding a first color on a planar page as a projection or equivalent to a projection of the left view on the page the page being vertically angled to the left image plane; and producing a right anaglyph image adding a contrasting color on the page as a projection or equivalent to a projection of the right view on the page. The perspective plane lies in the plane of the surface. Retinal rivalry is reduced by muting (desaturating) the original anaglyph colors in a color image of the object before adding the colors for the anaglyph.

6 Claims, 2 Drawing Sheets

ANAGLYPH AND METHOD

FIELD OF THE INVENTION

This invention relates in general to anaglyphs, and more specifically involves an anaglyph and method wherein the anaglyph of an object is equivalent to ray mapping, in contrasting colors, the object onto a surface from viewpoints. In a full-color anaglyph, those colors in the object similar to the contrasting anaglyph colors are first muted.

BACKGROUND OF THE INVENTION

An anaglyph is a stereoscopic picture composed of superimposed images; the viewed image of a three dimensional object as seen with the right eye of one color, e.g. red, is superimposed on the viewed image of the three dimensional object as seen with the left eye of a contrasting color, e.g. green. The superimposed viewed images produce a three dimensional effect of the object when viewed through correspondingly colored spectacle lenses.

Conventionally, an anaglyph is produced by superimposing two viewed images made from laterally displaced centers of perspective. Generally, a stereocamera or two, laterally-spaced cameras are used to produce the stereoscopic views. Alternately, particularly for a still life, the stereoscopic view can be produced by successive views from laterally displaced positions of a single camera. The two views are viewed orthogonally to the image plane.

In a conventional anaglyph, the perspective plane recedes into the surface of the anaglyph, and viewer's eyes are typically converging into the page, i.e. the convergence point is often past the plane of the surface supporting the anaglyph. This makes the surface more noticeable and detracts from the anaglyph.

SUMMARY OF THE INVENTION

This invention is an anaglyph and method of producing an anaglyph in which the perspective plane lies in the plane of the surface. The anaglyph on a surface of an object comprises: a left image of a first color; the left image being the equivalent of ray mapping the object onto the surface from a left viewpoint; and a right image of a contrasting color; the right image being the equivalent of ray mapping the object to the surface from a right viewpoint.

A method of making an anaglyph on a page of an object comprises the steps of: producing left and right stereoscopic images of the object by producing a left view of the object on a left image plane orthogonal to a viewing axis; and producing a right view of the object on a right image plane orthogonal to a viewing axis. Then, producing a left anaglyph image adding a first color on a planar page as a projection or equivalent to a projection of the left view on the page; the page being laterally parallel and vertically angled to the left image plane; and producing a right anaglyph image adding a contrasting color on the page as a projection or equivalent to a projection of the right view on the page.

Retinal rivalry is reduced by muting (desaturating) the original anaglyph colors in the image of the object before adding the colors for the anaglyph.

Other features and many attendant advantages of the invention will become more apparent upon a reading of the following detailed description together with the drawings wherein like reference numerals refer to like parts throughout.

DETAILED DESCRIPTION OF THE INVENTION

Figure 1:
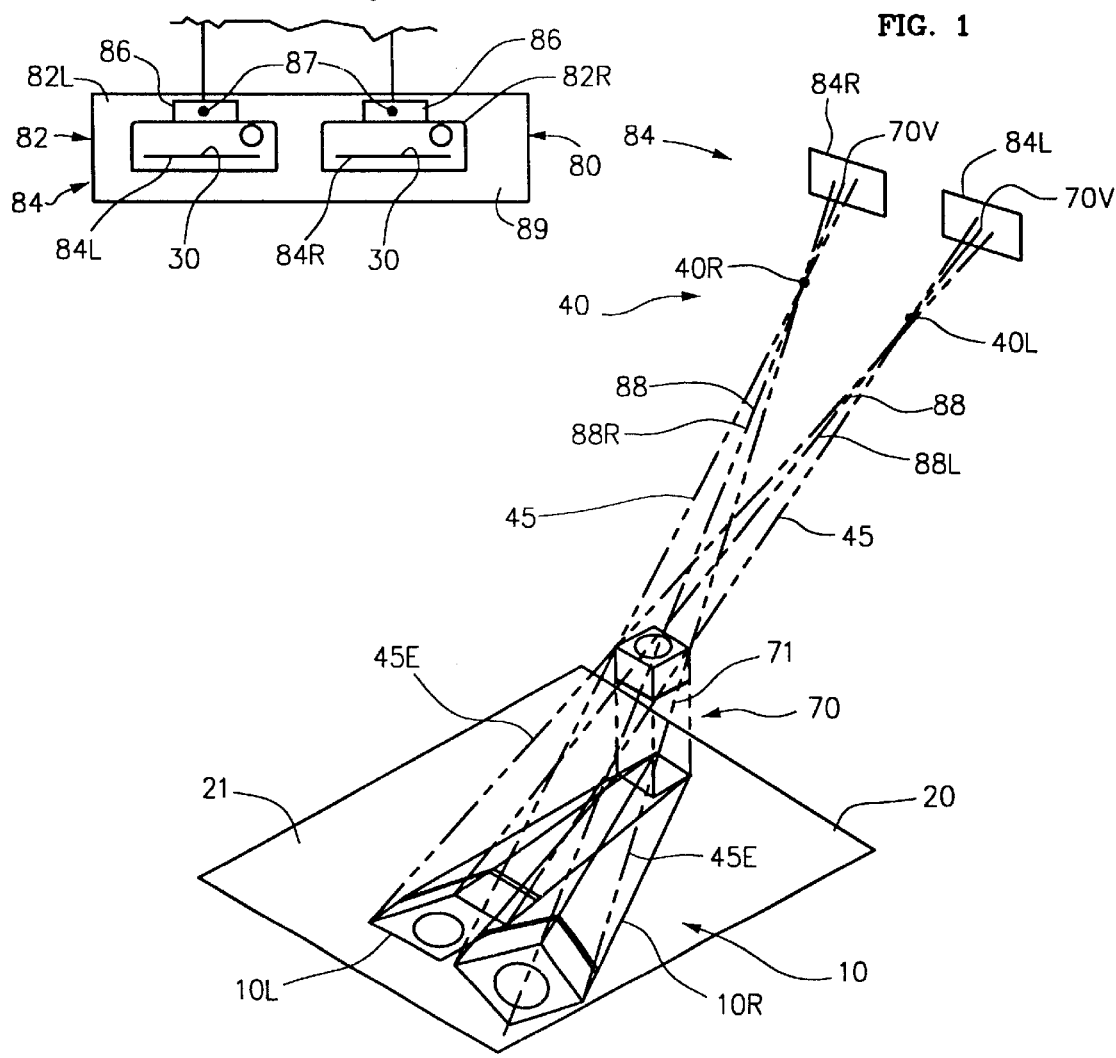
FIG. 1 is a diagrammatic perspective view illustrating the principle of the invention for producing an anaglyph of an object.

FIG. 1 is a diagrammatic perspective view illustrating the principle of the invention for producing an anaglyph 10 on a surface 20 of an object 70 (shown in phantom), such as a dispenser of paper clips 71. Anaglyph 10 includes a left anaglyph image 10L of a first color and a right anaglyph image 10R of a contrasting color (shown in bold lines). Anaglyph 10 depicts the position of object 70 relative to surface 20.

Object 70 is viewed from two viewpoints 40, left viewpoint 40L and right viewpoint 40R on view axes 88, left view axis 88L and right view axis 88R. Viewpoints 40 roughly represent the viewpoints used by a viewer, such as a human. Therefore the distance between viewpoints 40L, 40R typically approximates human eye separation distance. However, the separation distance between viewpoints 40 may vary somewhat to achieve specific desired results. For example, a more pleasing anaglyph of a large object is obtained by having viewpoints with wider separation far from the object. This maintains a consistent inter-ocular convergence angle. A convergence angle of about 5° often produces a more realistic effect at distance. A slightly exaggerated parallax effect sometimes produces a more desirable anaglyph.

Anaglyph 10 on surface 20 comprises a left anaglyph image 10L and a right anaglyph image 10R. Left image 10L is equivalent to ray mapping object 70 onto surface 20 in a first color from left viewpoint 40L. Right image 10R is equivalent to ray mapping object 70 onto surface 20 in a contrasting color from right viewpoint 40R. In ray mapping, an image of object 70 is transferred to surface 20 where a ray 45 or an extension 45E of a ray 45 between viewpoint 40L, 40R and object 70 contacts surface 20.

To view anaglyph 10, each eye is covered with a lens contrasting in color to the color of that eye's anaglyph image such that each eye sees only its associated image. When the eyes are properly placed on view axes 88, anaglyph 10 will appear to be a three dimensional object located in space relative to surface 20.

In the example of FIG. 1, object 70 is shown sitting on a plane surface 21. This would be a common positional arrangement, because objects usually rest on a surface, and anaglyph 10 would commonly be on a sheet of paper. However, for purposes of the invention, object 70 could be above or below surface 20 or object 70 could be passing through surface 20. Also, surface 20 can have almost any configuration and even need not be continuous. Surface 20 may be any surface capable of retaining the images 10R, 10L as seen from viewpoints 40L, 40R. It need not be flat. When viewed from the proper location, object 70 will still appear to be three dimensional. Surface 20 may be located between viewpoints 40L,40R and object 70; in which case, in the anaglyph 10 produced, object 70 will appear to be below surface 20.

Before departing from FIG. 1, it can be seen that if viewpoints 40 were camera lenses, then left and right view images 70V of object 70 could be made on left and right image planes 84L, 84R respectively.

The anaglyph 10 of the invention can be produced in several manners. In the first method described below, view images 70V made photographically are projected onto a final surface 20F at an angle so as to produce an anaglyph image equivalent of ray mapping the object onto final surface 20F. FIGS. 2–8 illustrate the photographic method of producing the anaglyph 10 of the invention.

Figure 2:
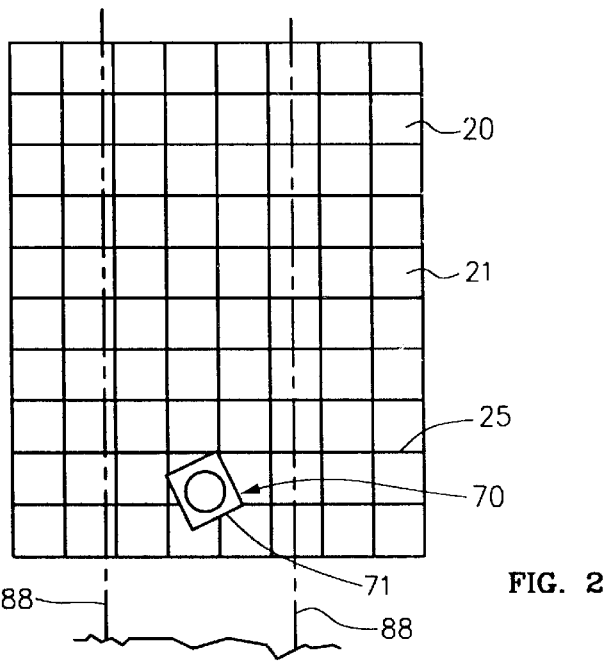
FIG. 2 is a diagrammatic top plan view of an apparatus for producing left and right views of an object.
Figure 4:
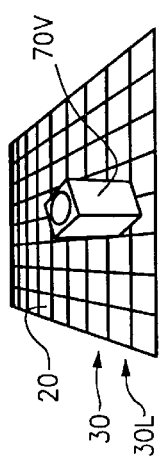
FIG. 4 is a partial view of the left view image of the object and surface.
Figure 3:
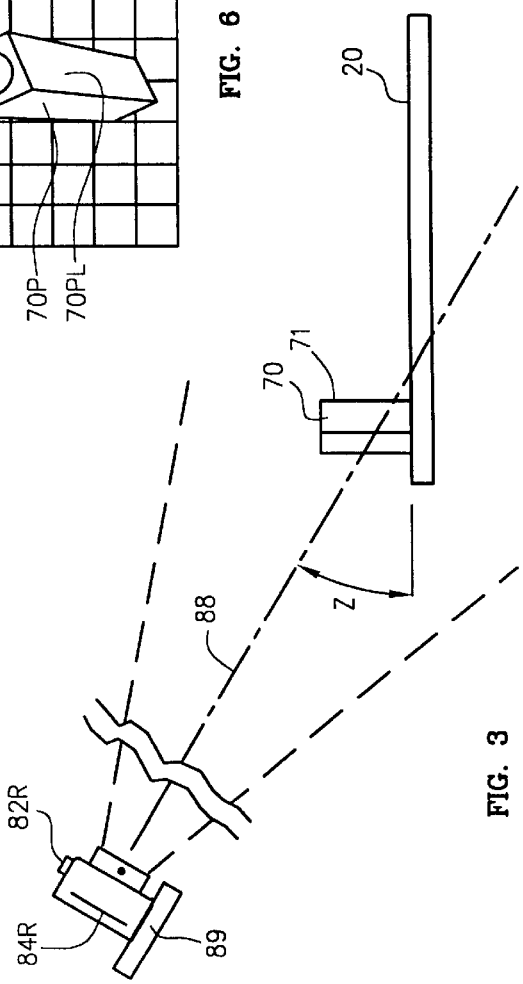
FIG. 3 is a side elevation view of the apparatus of FIG. 2.

FIG. 2 is a diagrammatic top plan view of one method using photographic apparatus 80 for producing view images 70V of FIGS. 3 and 4, such as left and right view images 70VL, 70VR of object 70, such as paper clip dispenser 71. FIG. 3 is a side elevation view of the apparatus of FIG. 1.

Two, laterally-spaced cameras 82, left camera 82L and right camera 82R, are held in desired position, alignment and spacing by means, such as an elevated platform 89. Alternately, a single stereoscopic camera may be used, or alternately, particularly for a still object, the stereoscopic view can be produced by successive views from laterally displaced positions of a single camera. The center 87 of each camera lens 86 serves as viewpoints 40. Cameras 82 include image planes 84. Left camera 82L includes left image pane 84L and right camera 82R includes right image plane 84R. Image planes 84 are orthogonal, or substantially orthogonal, to viewing axis 88 between cameras 82 and object. As seen in FIG. 2, viewing axes 88 need not converge on object 70. Each camera 82 takes a photograph, i.e. a view image 30, of object 70. The view image 30 lies in the image plane. 84.

Cameras 82 are positioned relative to object 70 to obtain the desired view of object 70. For an anaglyph 10 of a small object 70 relative to a surface 20 such as a sheet of paper, the camera angle Z between viewing axis 88 and plane 20 is typically in the range of 30° and the distance from camera 82 to object is typically about arms'-length.

Figure 5:
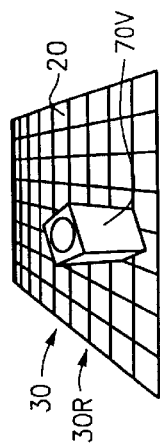
FIG. 5 is a partial view of the right view image of object and surface.

FIG. 4 is a partial view of the left view image 30L showing view 70V of object 70 and surface 20 as produced by left camera 82L. FIG. 5 is a partial view of the right view image 30R showing view 70V of object 70 and surface 20 as produced by right camera 82R. A conventional anaglyph could be produced by superimposing the object images of FIG. 4 and FIG. 5 and coloring them with contrasting colors. The two views are viewed orthogonally to the image plane through lenses of correspondingly contrasting colors. Note that the perspective plane then recedes from the viewer into the surface.

Figure 7:
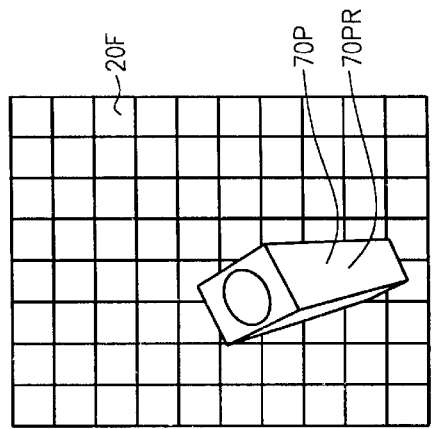
FIG. 7 is a projection of the right view of the object of FIG. 5 on a surface.
Figure 6:
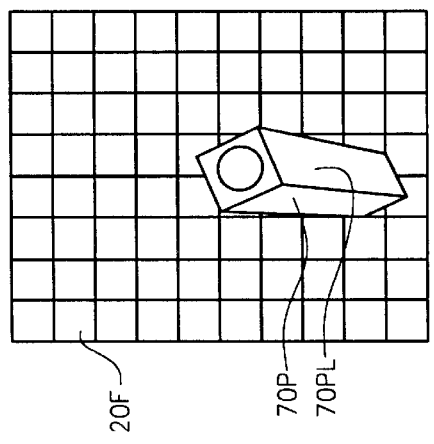
FIG. 6 is a projection of the left view of the object of FIG. 4 on a surface.
Figure 8:
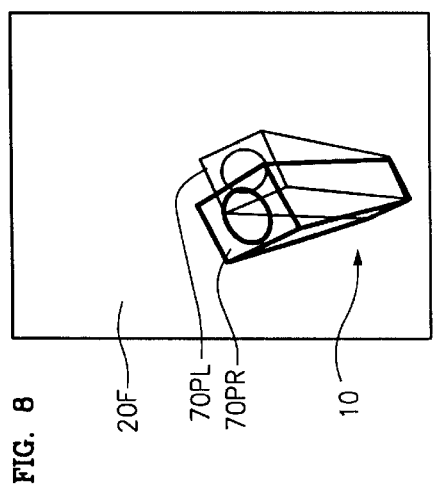
FIG. 8 is the superposition of FIGS. 6 and 7 to form the anaglyph of the object on a surface.

Anaglyph 10 of the invention may be produced by making projected images 70P of the object portion 70V of view images 30 onto a final surface 20F. FIG. 6 is a left projected image 70PL on a surface 20F of the object portion 70V of object 70 of left view image 30L, and FIG. 7 is a right projected image 70PR on surface 20F of object portion 70V of right view image 30R of FIG. 5. FIG. 8 is the superimposition of FIGS. 6 and 7 to form the anaglyph 10 of object 70 on surface 20F. This projection process can be performed as, essentially the reverse of the photographic process of FIG. 3 with projectors replacing the cameras. Left view image 30L is placed in the prior location of left image plane 84L and projected onto surface 20F. Right view image 30R is placed in the prior location of right image plane 84R and projected onto surface 20F. Projected images 70 must be appropriately colored at some point. This can be done physically at the end or with filters or other means during the image gathering or projecting as is well known in the art.

Anaglyph 10, comprised of projected images 70PR and 70PL, is viewed at the projected angle. Note, the perspective plane recedes from the viewer along the surface 20F.

In another method of producing anaglyph 10, conventional image views are digitized by taking a digitized photo or by computer scanning a conventional photographic view 30. Then, the digitized view is manipulated on a computer either mathematically or by a software program, such as Photo Shop by Adobe®, to directly produce the projected images 70P. The grid 25 was placed on surface 20 in FIGS. 2 and 4–7 to better illustrate manipulation of the image views 30 to produce projected images 70P. FIGS. 6 and 7 can be derived from FIGS. 4 and 5 respectively either by enlarging each grid area to its original size such as can be done by computer programs such as Adobe Photo Shop, or by physically mapping the object images 70V coordinates of FIGS. 4 and 5 onto the grid coordinates of FIGS. 6 and 7. The vertical aspect is stretched approximately 250% on an increasing scale from bottom to top. The horizontal aspect is stretched from approximately 50% at the top to nothing at the bottom. The top of each image is skewed left or right to achieve right angles.

The anaglyph colors, e.g. red and cyan, can be added to the views by using a computer program that adjusts color values, such as the Adobe Photo Shop "Curves" feature.

Anaglyph 10 of the invention can also be produced by straight mathematical modeling in a computer.

Anaglyph Color Muting

Anaglyph imaging of full color objects produces one unpleasant retinal rivalry effect. Assuming that red and cyan are used as the anaglyph colors, reds, especially bright reds, in the object seem white as viewed through the red lens but appear black as viewed through the cyan lens, while cyans, especially bright cyans, in the object appear white as viewed through the cyan lens but appear black as viewed through the red lens. This results in an unpleasant flickering distraction.

This retinal rivalry effect can be greatly reduced by first muting or suppressing the original anaglyph colors in the image of the object before adding the colors for the anaglyph. One method of muting the original anaglyph colors is operating on a digitized image with a computer program such as Adobe Photo Shop "Hue/Saturation" feature. Using this feature, the color saturation in the anaglyph colors of the original object can be desaturated (muted), such as by 65–85% and preferably by about 75%. Then each anaglyph color is re-added to its respective view as described above.

In many circumstances the anaglyph of the invention is superior in appearance and impact to conventional anaglyphs. It is particularly useful and striking in advertising, such as in magazines.

Although a particular embodiment of the invention and method for producing same have been illustrated and described, various changes may be made in the form, composition, construction, and arrangement elements without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. An anaglyph on a surface of an object; said anaglyph depicting the position of the object relative to the surface; said anaglyph comprising:

a left anaglyph image on the surface; said left anaglyph image having an added first color; said left anaglyph image equivalent to a ray map of the object on the surface from a left viewpoint on a left view axis which is not orthogonal to the surface; and a right anaglyph image on the surface; said right anaglyph image having an added contrasting color; said right anaglyph image equivalent to a ray map of the object on the surface from a right viewpoint on a right view axis which is not orthogonal to the surface.

2. An anaglyph on a surface of an object; the surface having an associated plane; said anaglyph comprising:

a left anaglyph image of the object on the surface; said left anaglyph image having an added first color; and a right anaglyph image of the object on the surface; said right anaglyph image having an added contrasting color; whereby, when said anaglyph is viewed stereographically, the perspective plane lies in the plane of the surface.

3. The anaglyph of claim 1 wherein:

the left and right viewpoints are spaced to simulate human eye spacing.

4. The anaglyph of claim 1 wherein:

the surface is a thin planar sheet.

5. A method of making an anaglyph on a surface of an object; the method comprising the steps of:

producing left and right stereoscopic images of the object by producing a left view of the object on a left image plane orthogonal to a viewing axis not orthogonal to the surface; and producing a right view of the object on a right image plane orthogonal to a viewing axis not orthogonal to the surface;

producing a left anaglyph image adding a first color on a surface as equivalent to a projection of the left view on the surface; and producing a right anaglyph image adding a contrasting color on the surface as equivalent to a projection of the right view on the surface.

6. A method of making an anaglyph on a planar page of an object; the method comprising:

producing left and right stereoscopic images of the object by producing a left view of the object on a left image plane orthogonal to a viewing axis not orthogonal to the page; and producing a right view of the object on a right image plane orthogonal to a viewing axis not orthogonal to the page;

producing a left anaglyph image by projecting the left view on the planar page;

producing a right anaglyph image by projecting the right view on the planar page;

adding a first color to the left anaglyph image; and adding a contrasting color to the right anaglyph image.

* * * * *